(12) United States Patent
Campeau

(10) Patent No.: US 7,905,247 B2
(45) Date of Patent: Mar. 15, 2011

(54) VACUUM ACTUATED VALVE FOR HIGH CAPACITY STORAGE AND DELIVERY SYSTEMS

(75) Inventor: Serge Campeau, Lancaster, NY (US)

(73) Assignee: Praxair Technology, Inc., Danbury, CT (US)

( * ) Notice: Subject to any disclaimer, the term of this patent is extended or adjusted under 35 U.S.C. 154(b) by 140 days.

(21) Appl. No.: 12/143,401

(22) Filed: Jun. 20, 2008

(65) Prior Publication Data

US 2009/0314009 A1  Dec. 24, 2009

(51) Int. Cl.
*F16K 31/126* (2006.01)

(52) U.S. Cl. ............... 137/494; 137/375; 137/505.37; 137/613; 137/906; 137/907; 251/123

(58) Field of Classification Search .............. 137/494, 137/495, 906, 613, 375; 251/118, 335.3, 251/123

See application file for complete search history.

(56) References Cited

U.S. PATENT DOCUMENTS

| | | |
|---|---|---|
| 3,245,583 A | 4/1966 | Miller et al. |
| 3,682,437 A | 8/1972 | Miller et al. |
| 3,709,242 A | 1/1973 | Chase |
| 4,134,449 A | 1/1979 | La Haye et al. |
| 4,143,672 A | 3/1979 | West |
| 4,793,379 A | 12/1988 | Eidsmore |
| 5,303,734 A | 4/1994 | Eidsmore |
| 5,409,526 A | 4/1995 | Zheng et al. |
| 5,937,895 A | 8/1999 | Le Febre et al. |
| 6,007,609 A | 12/1999 | Semerdjian et al. |
| 6,045,115 A | 4/2000 | Martin, Jr. et al. |
| 6,089,027 A | 7/2000 | Wang et al. |
| 6,101,816 A | 8/2000 | Wang et al. |
| 6,155,540 A | 12/2000 | Takamatsu et al. |
| 6,343,476 B1 | 2/2002 | Wang et al. |
| 6,474,076 B2 | 11/2002 | Wang et al. |
| 6,857,447 B2 | 2/2005 | Olander et al. |
| 6,868,869 B2 | 3/2005 | Olander |
| 6,910,602 B2 | 6/2005 | Hasaka et al. |
| 6,959,724 B2 | 11/2005 | Heiderman |
| 7,013,916 B1 | 3/2006 | Pearlstein et al. |
| 2002/0014227 A1 | 2/2002 | Girouard |
| 2004/0107997 A1 | 6/2004 | Tom |

FOREIGN PATENT DOCUMENTS

| | | |
|---|---|---|
| WO | WO2004/052190 A1 | 6/2004 |
| WO | WO2004065750 | 8/2004 |

*Primary Examiner* — Stephen M Hepperle
*Assistant Examiner* — William McCalister
(74) *Attorney, Agent, or Firm* — Iurie A. Schwartz

(57) ABSTRACT

The invention relates to a re-configured valve design to accommodate a high volume of product in the delivery system and the dispensation of product upon the application of a predetermined vacuum condition on the downstream side of the valve.

16 Claims, 7 Drawing Sheets

Standard pin/poppet assembly

Actuation pressure for standard pin/poppet seal at 5 sccm flow rate

VACUUM ACTUATED VALVE FOR HIGH CAPACITY STORAGE AND DELIVERY SYSTEMS

BACKGROUND OF THE INVENTION

1. Field of the Invention

The present invention relates to a high pressure storage and delivery system having a modified vacuum actuated valve to prevent the hazardous discharge of fluid from a vessel such as a pressurized cylinder or tank. More specifically, the invention relates to a re-configured valve design to accommodate a high volume of product in the delivery system and the dispensation of product upon the application of a predetermined vacuum condition on the downstream side of the valve.

2. Description of Related Art

Industrial processing and manufacturing applications require the use of highly toxic fluids. The manufacture of semiconductor materials represents one such application wherein the safe storage and handling of highly toxic hydridic or halidic gases becomes necessary. Examples of such gases include silane, germane, ammonia, phosphine, arsine, stibine, hydrogen sulfide, hydrogen selenide, hydrogen telluride, phosphorous trifluoride, arsenic pentafluoride and other halide compounds. As a result of toxicity and safety considerations, these gases must be carefully stored and handled in the industrial process facility. The semiconductor industry in particular relies on the gaseous hydrides of arsine ($AsH_3$) and phosphine ($PH_3$), boron triflouride ($BF_3$), silicon tetrafluoride as sources of arsenic (As), phosphorus (P), boron (B), and (Si) in ion implantation. Ion implantation systems typically use dilute mixtures of $AsH_3$ and $PH_3$ stored at pressures as high as 800 psig and pure gases such as $BF_3$ and $SiF_4$ stored at pressures as high as 1500 psig within the delivery vessel. Due to their extreme toxicity and high vapor pressure, their use, transportation and storage raise significant safety concerns for the semiconductor industry.

To address the various safety concerns, there have been a number of systems developed to deliver these hydridic and halidic compounds to the ion implant tool at sub-atmospheric conditions. For example, a chemical system, known as SDS™ and commercialized by ATMI, Inc. involves filling a compressed gas cylinder with a physical adsorbent material (beaded activated carbon), and reversibly adsorbing the dopant gases onto the material. The desorption process involves applying a vacuum or heat to the adsorbent material/cylinder. In practice, vacuum from the ion implanter is used to desorb the gas from the solid-phase adsorbent. There are certain limitations associated with the SDS technology, and they include: 1) the adsorbent material has a finite loading capacity thereby limiting the amount of product available in a given size cylinder; 2) the desorption process can be initiated by exposing the cylinder package to heat, thereby causing the cylinders to reach and deliver gases at atmospheric and super-atmospheric pressures when the cylinder is exposed to temperatures greater than 70° F., which are common in many cylinder warehouse locations and within the ion implant tool; 3) the purity of the gas delivered from the cylinder can be compromised due to adsorption/desorption of the other materials/gases on the adsorbent material; 4) cylinder percent utilization is highly influenced by the depth of vacuum applied to the package, i.e. cylinders are often returned with appreciable product left in the package; and 5) adsorbent attrition can lead to particulate contamination in the gas delivery system.

Separately, a number of mechanical systems have been developed for the sub-atmospheric delivery of dopant gases. Some involve the use of a pressure regulator, while others require valve devices to control and deliver the product sub-atmospherically. These devices are set to deliver or open when sub-atmospheric or vacuum conditions are applied to the delivery port of the cylinder. The exact location of these devices can be in the port body, in the neck cavity, inside the cylinder itself, or combinations of all three locations. In each case the pressure regulator or valve device is located upstream of the cylinder valve seat with respect to flow of gas from the interior of the cylinder to the delivery port.

U.S. Pat. Nos. 6,089,027 and 6,101,816 are both related to a fluid storage and dispensing system comprising a vessel for holding a desired pressure. The vessel contains a pressure regulator, e.g., a single-stage or multi-stage regulator, associated with a port of the vessel, and set at a predetermined pressure. A dispensing assembly, e.g., including a flow control means such as a valve, is arranged in gas/vapor flow communication with the regulator, whereby the opening of the valve effects dispensing of gas/vapor from the vessel. The fluid in the vessel may be constituted by a liquid that is confined in the vessel at a pressure in excess of its liquefaction pressure at prevailing temperature conditions, e.g., ambient (room) temperature.

U.S. Pat. No. 6,857,447 B2 discloses a gas dispensing assembly wherein the source vessel contains a gas at pressures ranging from 20 to 2,000 psig. The apparatus requires a high pressure gas cylinder with a larger than typical neck opening to accommodate the introduction of two pressure regulators in series along the fluid discharge path. The first regulator on the inlet gas side drops the pressure from 1,000 psig (or the actual pressure within the vessel at the time) to 100 psig, while the second regulator from 100 psig to sub-atmospheric pressure.

U.S. Pat. No. 5,937,895 is directed to fluid storage and dispensing vessel having a dispensing valve and a flow restriction arrangement to provide a virtually fail safe system for preventing hazardous discharge of fluid from a pressurized cylinder or tank. U.S. Pat. Nos. 6,007,609 and 6,045,115 disclose flow restrictors disposed along the fluid flow path and which provide capillary size openings that minimize any discharge of toxic gases from compressed gas cylinders in the unlikely event that the dispensing valve fails. The disclosure of these latter three documents provide for a sub-atmospheric delivery system, wherein the bellows chamber is located downstream of a pin/poppet assembly with respect to the flow of gas through a valve.

The drawbacks associated with the related art storage and delivery systems is that they are unable to handle cylinder fill pressures greater than 600 psig or otherwise would require two devices in series. For example, while arsine and phosphine cylinder packages are filled as liquefied fluids, the internal pressure of these fluids is limited to their respective vapor pressures which at 70° F. typically range from about 205 to about 580 psig. However, fluids such as boron trifluoride, and silicon tetrafluoride fluids are filled as a gas phase product, and the cylinder fill pressure required is 600 psig or greater. Specifically, the related art systems cannot work at cylinder pressures greater than 600 psig due to pin/poppet design of the dispensing valve.

Another disadvantage in the present systems is that they cannot accommodate a higher capacity of fluid product and, therefore, require frequent replacement of the cylinder package. In turn this leads to frequent change out of the product cylinder and increased down time for the semiconductor manufacturer.

To overcome the disadvantages of the related art it is an object of the present invention to provide a novel dispensing valve which would allow for storage and delivery of fluids in gaseous and/or partial gaseous/liquefied phase, where the fluids are stored at pressures greater than 600 psig. In particular, the dispensing valve has been re-designed to include a sealing mechanism that is reliable at high pressures, and can withstand the numerous open/close cycles.

It is another object of the present invention to increase the capacity of the cylinder/tank without changing the dimensions of the cylinder/tank or the cylinder valve head, including the port body. In this manner a higher volume of gas can be accommodated in the cylinder/tank. As a result, a reduction in customer's process variability and an increase in productivity is achieved. Moreover, an economic and safety benefit is attained by having fewer cylinder/tank change outs, thereby reducing the down-time of the semiconductor manufacturing tool.

Other objects and aspects of the present invention will become apparent to one of ordinary skill in the art upon review of the specification, drawings and claims appended hereto.

SUMMARY OF THE INVENTION

According to an aspect of the invention, a vacuum actuated check valve for delivery of a fluid from a pressurized fluid source to a downstream processing tool is provided. The check valve includes a valve base having a pin inserted therethrough for communication with a bellows chamber downstream, wherein the pin and the valve base form a passageway therebetween. The pin is adapted for reciprocal movement to bias a spring bushing. The valve base has a counterbore therein to accommodate a sleeve and an o-ring disposed concentrically around the lower section of the pin, where the pin is firmly held in place by the spring bushing adapted to movement between a sealing position that blocks fluid flow along the passageway and an open position that permits fluid along the passageway. The bellows chamber disposed downstream of the valve base and pin, and defines an interior volume isolated from the pressure condition upstream of the pin. The bellows chamber is adapted to expand when communication with a discharge path produces a vacuum condition around the bellows and forces a contact plate to impinge onto the pin so as to bias the spring bushing away from the valve base to an open position to allow fluid flow through the passageway in the valve base.

According to another aspect of the invention, system for controlling the discharge of pressurized fluids from the outlet of a pressurized tank containing hydridic or halidic compounds is provided. The system includes:

a tank for holding pressurized fluids in a gaseous or partially gaseous phase;

a port body for communicating with the outlet of the pressurized tank defining a fluid discharge path;

a vacuum actuated check valve disposed along the fluid discharge path including a valve base having a pin inserted therethrough for communication with a bellows chamber downstream, wherein the pin and the valve base form a passageway therebetween, the pin is adapted for reciprocal movement to bias a spring bushing, the valve base having a counterbore therein to accommodate a sleeve and an o-ring disposed concentrically around the lower section of the pin, where the pin is firmly held in place by the spring bushing adapted to movement between a sealing position that blocks fluid flow along the passageway and an open position that permits fluid along the passageway; and the bellows chamber disposed downstream of the valve base and pin, wherein the bellows chamber defines an interior volume isolated from the pressure condition upstream of the pin, the bellows chamber is adapted to expand when communication with a discharge path produces a vacuum condition around the bellows and forces a contact plate to impinge onto the pin so as to bias the spring bushing away from the valve base to an open position to allow fluid flow through the passageway in the valve base.

In accordance with yet another aspect of the present invention, a cylinder and a valve assembly for containing pressurized fluid and controlling the discharge of pressurized fluids from the cylinder is provided. The cylinder and valve assembly includes:

a cylinder having a cylinder opening;

a port body adapted for sealing engagement with the cylinder opening;

a fluid inlet port defined by the port body and located within the cylinder;

a fluid outlet port defined by the port body and located outside the cylinder;

a fluid discharge path defined by the port body between the fluid inlet port and the fluid outlet port;

a shut-off valve for controlling fluid flow along the fluid discharge path;

a vacuum actuated check valve disposed along the fluid discharge path including a valve base having a pin inserted therethrough for communication with a bellows chamber downstream, wherein the pin and the valve base form a passageway therebetween, the pin is adapted for reciprocal movement to bias a spring bushing, the valve base having a counterbore therein to accommodate a sleeve and an o-ring disposed concentrically around the lower section of the pin, where the pin is firmly held in place by the spring bushing adapted to movement between a sealing position that blocks fluid flow along the passageway and an open position that permits fluid along the passageway; and the bellows chamber disposed downstream of the valve base and pin, wherein the bellows chamber defines an interior volume isolated from the pressure condition upstream of the pin, the bellows chamber is adapted to expand when communication with a discharge path produces a vacuum condition around the bellows and forces a contact plate to impinge onto the pin so as to bias the spring bushing away from the valve base to an open position to allow fluid flow through the passageway in the valve base.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides a low pressure or sub-atmospheric pressure storage and delivery system as a source gas supply for applications involving semiconductor processing, such as ion implantation. The system controls the discharge of pressurized fluids stored in gaseous or partially gaseous phase. For purposes of explanation, the invention is further described in the context of the delivery of boron trifluoride. However, it will be understood by those skilled in the art that any hydridic or halidic compound such as enriched boron trifluoride (i.e., $^{11}BF_3$), silane, fluorine carbon monoxide, silane, nitrogen trifluoride or silicon tetrafluoride may be utilized.

Figure 1:
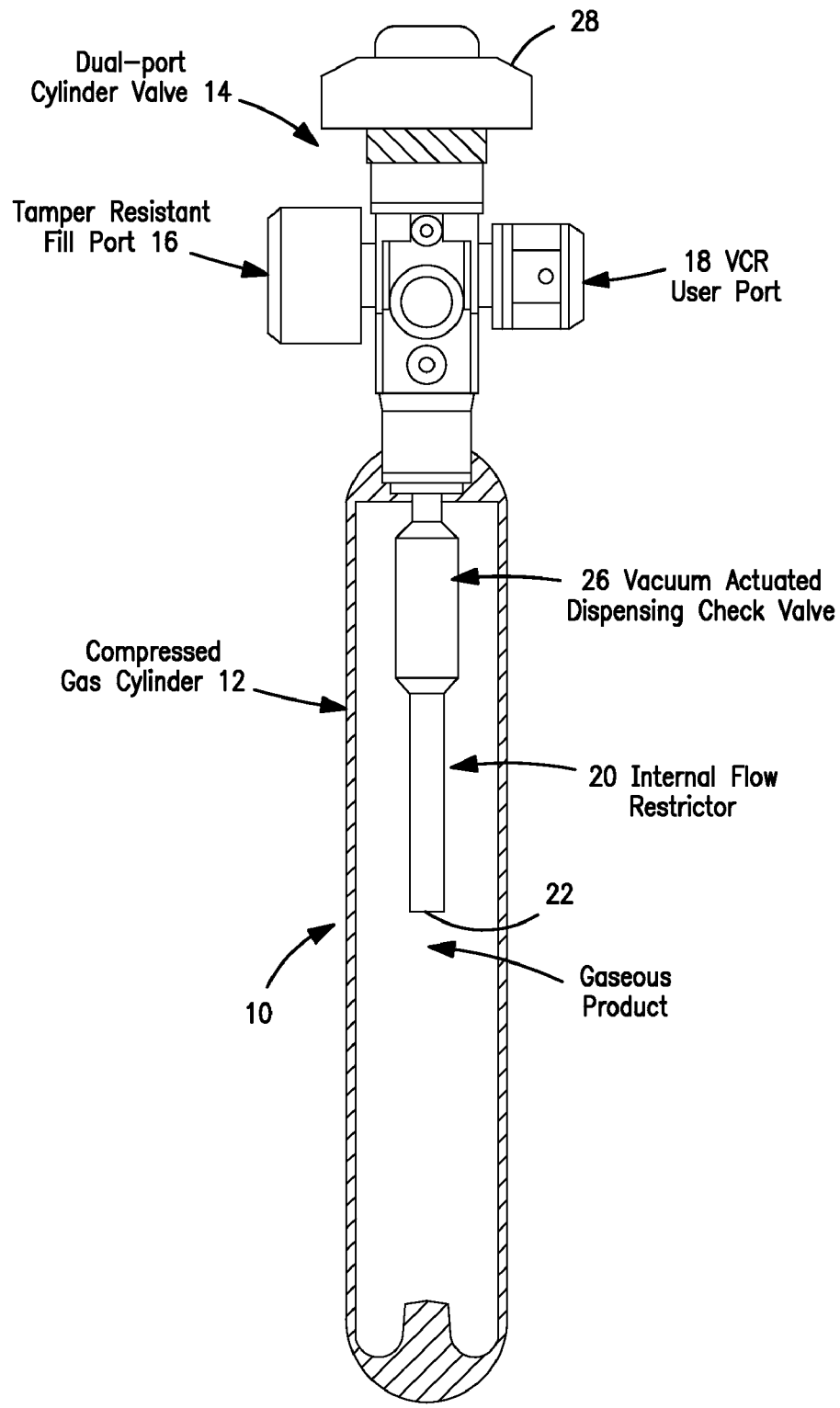
FIG. 1 illustrates a schematic cross-sectional view of a system for the storage and controlled dispensation of a pressurized fluid therefrom.

As illustrated in FIG. 1, a system 10 for the storage and delivery of pressurized and toxic fluid is depicted. System 10 includes high pressure cylinder or tank 12 containing boron trifluoride in gaseous or partially gaseous phase. The compressed gas cylinder can be a conventional 500 cc cylinder, such as the one approved by the Department of Transportation 3AA cylinder, but is not limited thereto. A cylinder valve head 14 is threadably engaged at the top end of cylinder 12. The cylinder valve head 14 can be dual-port 316 stainless steel valve, such as the one manufactured by Ceodeux, Inc. The dual-port valve cylinder head 14 has a tamper resistant fill port 16, through which cylinder 12 is filled with product. Upon filling, the user can draw product from the cylinder through user port 18, which is a face-seal VCR™ port having an outlet opening ranging from about 0.25 to about 0.5 inches. The interior of the cylinder contains an internal flow restrictor 20 having an inlet 22. Until exhausted, boron trifluoride flows into inlet 22, through the internal flow restrictor and a vacuum actuated check valve 26, along a fluid flow path, described in detail below, to user port 18.

Vacuum actuated check valve 26 contains a bellows chamber that automatically controls the discharge of boron trifluoride fluid from the cylinder. Naturally, check valve 26 can be disposed in the port body of the dual-port valve, upstream of the dual-port valve, within the cylinder or partly in the dual-port valve and partly within the cylinder along the fluid flow path. As shown in the exemplary embodiment of FIG. 1, the vacuum actuated check valve is fully disposed inside cylinder 12, by affixing one portion of the check valve to the housing which is located along the fluid discharge path. A handle 28 at the top of dual-port valve allows manual control of the fluid along the fluid discharge path leading to user port 18. This type of a fluid storage and dispensing system is described in aforementioned U.S. Pat. Nos. 5,937,895, 6,007,609 and 6,045,115, albeit referencing a single port valve cylinder head, and which are incorporated herein by reference in their entirety.

Figure 2:
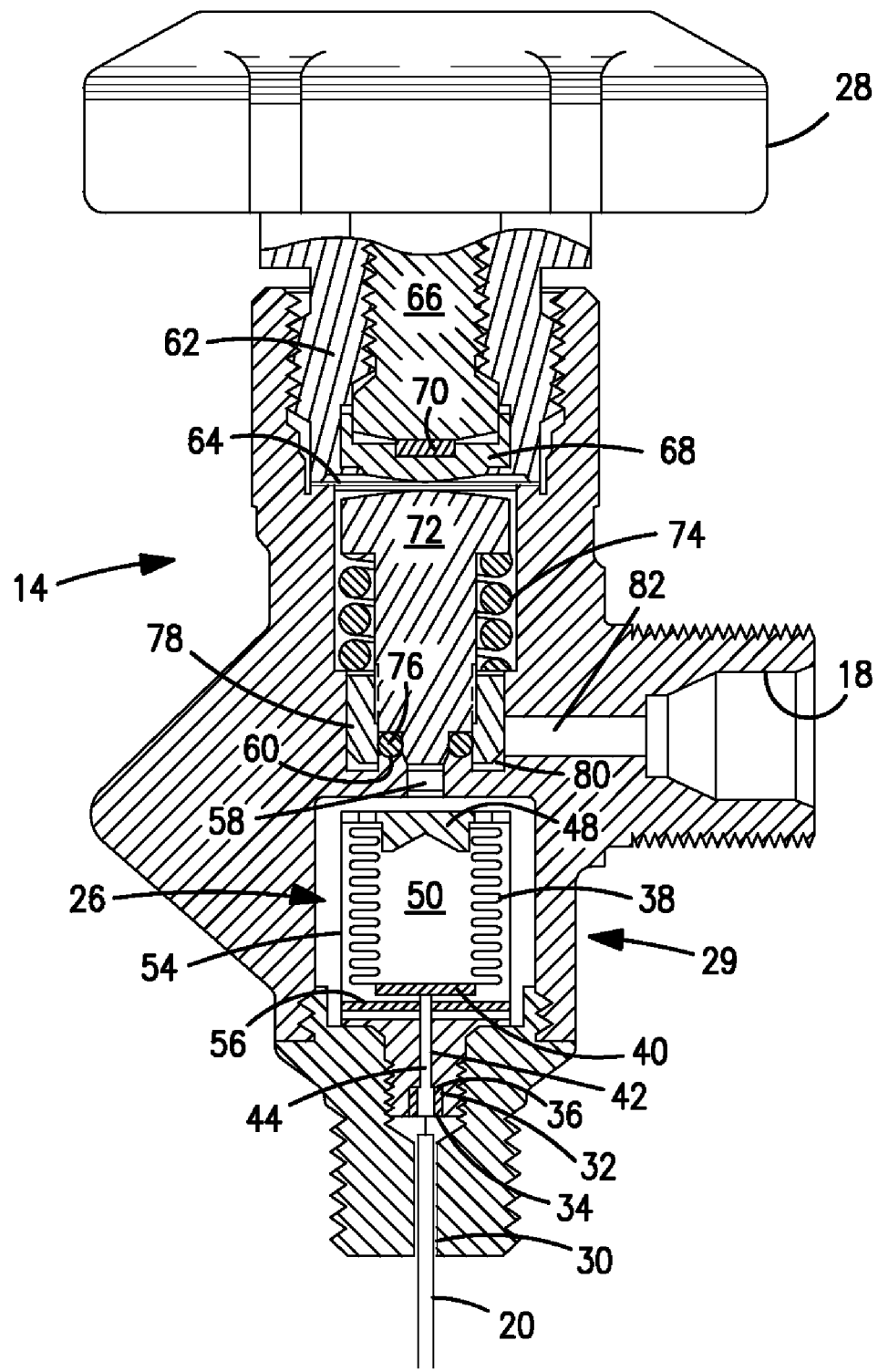
FIG. 2 depicts an enlarged schematic cross-sectional view of the valve head assembly having a vacuum actuated check valve disposed therein.

With reference to FIG. 2, the fluid flow path is illustrated vis-à-vis the inner components. In an exemplary embodiment, and for ease of explanation, the vacuum actuated check valve 26 is disposed in port body 29 of single port cylinder valve head 14. Following then the path of the boron trifluoride gas out of head valve 14, the gas first enters valve inlet 30 through internal flow restrictor tube 20. The port body of head valve 14 contains the vacuum actuated check valve 26. Entering gas first contacts valve element in the form of poppet 32. A spring 34 biases poppet valve 32 against a valve seat 36 to create a closed condition along the gas flow path. As shown in FIG. 2(*a*) in a conventional pin/poppet design, poppet valve 32 is a conical shaped device which fits into a matching conical seating cavity, referred herein, as valve seat 36. The valve seat is counterbored into valve base 84 and maintains a positive seal across valve seat 36. Spring 34 normally presses poppet valve 32 against valve seat 36 until the bellows 38 expand to displace a contact plate 40. Contact plate 40 acts on a control pin 42 that pushes poppet 32 away from valve seat 36. Boron trifluoride gas may then flow through pin passage 44 around pin 42 and into a housing 54 that accommodates the bellows 38.

Bellows chamber 50 consists of a bellows guide 48 that defines an internal pressure chamber having an outer sleeve/housing 54 that surrounds the exterior of the bellows chamber; and a bottom guide plate 56. Sealing contact at the upper end of the bellows with bellows guide 48, and at the lower end of the bellows with contact plate 40, isolates the bellows from pressure within vacuum actuated check valve 26 and the gas flow path in general. The internal part of bellows chamber 50 (i.e., the pressure chamber) is typically sealed at atmospheric or super-atmospheric pressure such that a reduction in pressure in the housing surrounding bellows chamber 50 causes the gases in bellows chamber 50 to expand bellows and urge contact plate 40 downward against pin 42. This type of bellows chamber is disclosed in co-pending U.S. Ser. No. 11/635,875 and incorporated herein by reference in its entirety.

Bellows guide 48 retains outer sleeve 54 about its outer edge. Outer sleeve 54 positions with guide plate 56. Together, bellows guide 48, outer sleeve 54 and guide plate 56 protectively enclose bellows chamber 50. Pin 42 passes through a central hole in the guide plate 56 to maintain its alignment with contact plate 40.

Boron trifluoride gas that passes out of the housing encompassing bellows chamber 50 flows through a valve inlet port 58 and across a sealing surface 60. Threaded bushing 62 clamps a multi-layer metallic diaphragm 64 to port body 29 thereby forming a positive seal against fluid leaking past the valve stem 66. Handle 28 operating in conjunction with threaded valve stem 66, forces piston 68 via friction pad 70 onto diaphragm 64 to move the main valve plunger 72 down against the resisting force of spring 74. Downward movement of plunger 72 forces a elastomer sealing element 76, retained by nut 78, to create a seal at surfaces 60. Backing valve stem 66 away from diaphragm 64 allows spring 74 to force valve plunger 72 up, thereby separating the sealing surfaces 60 and permitting gas to flow through port 58. Once past sealing surfaces 60 boron trifluoride gas flows from a chamber 80 through conduit 82 and to the user port 18.

This check valve 26 can be set to reliably prevent opening of the poppet 32 until pressure within the bellow housing drops to a vacuum condition. This condition is usually equal to 760 torr or less. With this setting of the vacuum actuated check valve, turning handle 28 in a counter clockwise direction so as to retract valve plunger 70, would not result in a dispensation of boron trifluoride from the cylinder. Since the typical end-user's apparatus operates at pressure less than 100 torr, dispensing boron trifluoride at a vacuum, and particularly at pressures of 500 torr of less, has several distinct advantages. For instance there is a negative pressure at all of the boron trifluoride gas connections, so leaks can only leak into the end-user apparatus where they are quickly detected by the apparatus itself. Thus, one does not have to check joint by joint to verify that there are any leaks. In addition no external regulators are required for reducing the tank pressure to pressures acceptable to the end-user's mass flow controllers. More importantly an accidental opening of a pipe connection in the boron trifluoride system as described above is orders of magnitude less hazardous than accidental opening of a high-pressure delivery system connection.

It has been found, however, that the redesigned pin/poppet assembly in accordance to the present invention allows for effective sealing and functioning of vacuum actuated check valve 26 at pressures greater than 600 psig. As a result, cylinders containing a fluid in gaseous state, such as boron trifluoride, can be filled to pressures exceeding 600 psig and up to 1500 psig.

Figure 3:
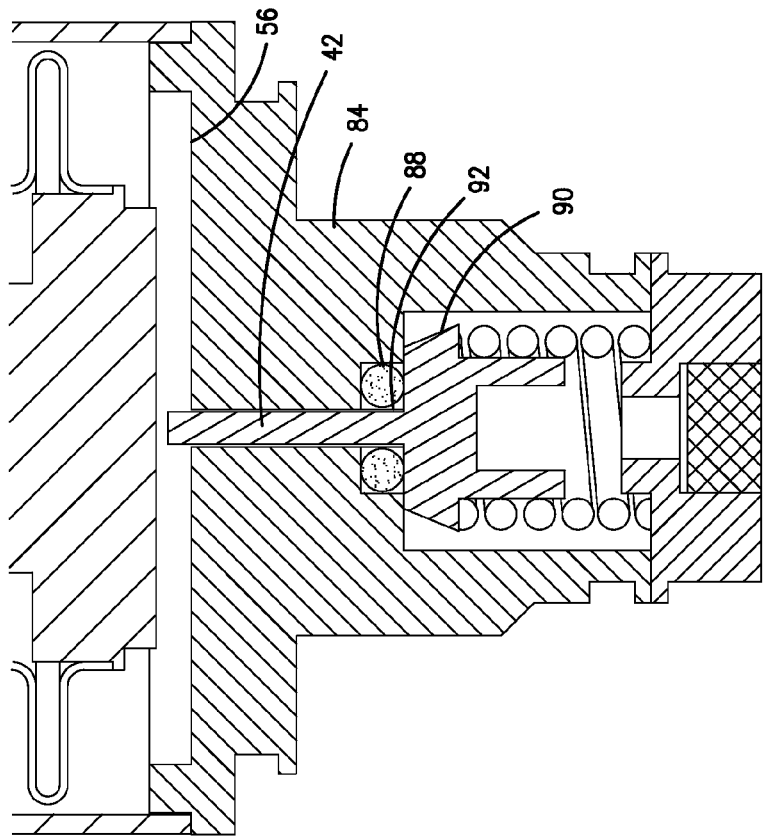
FIG. 3, depicts a schematic cross-sectional view of the vacuum actuated check valve in accordance with the invention.
Figure 2A:
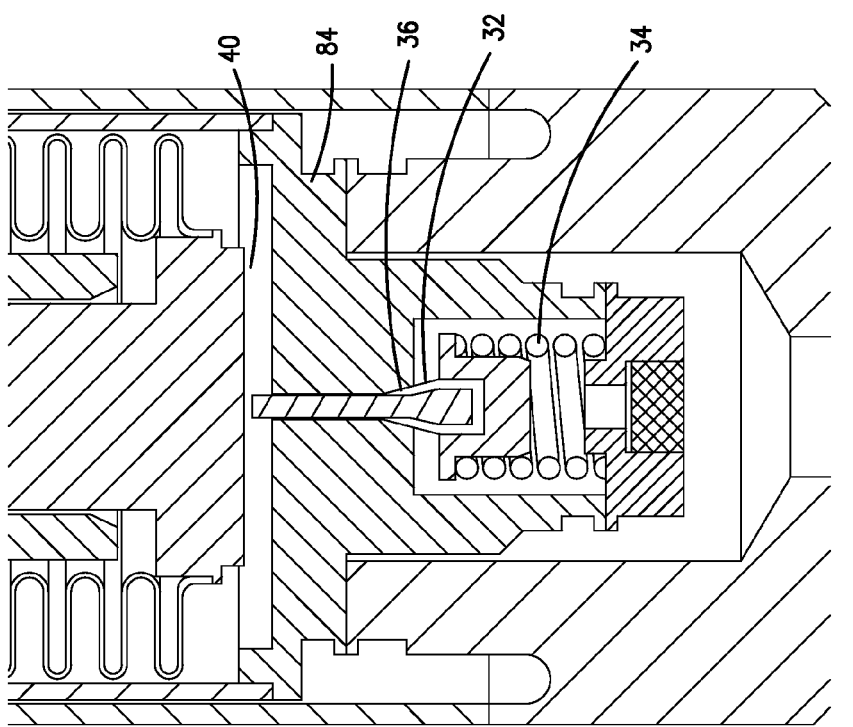
FIG. 2(a) is a schematic view of the pin/poppet assembly in the conventional vacuum actuated check valve.

With reference to FIG. 3, a recessed counterbore or groove is formed in valve base 84 to accommodate an o-ring 88. This o-ring can be a perfluoro-elastomer material or an equivalent thereof as long as such material meets the rigorous sealing requirement and separately, the mechanical ones of compression and decompression. A modified control pin 42 is provided, wherein said pin having a substantially uniform circumference dimensions extends from slightly above bottom guide plate 56 into the spring bushing 90. A sleeve or tubular component 92 is disposed between the circumference of control pin 42 shaft and the inside radius of the o-ring installed in valve base 84. This sleeve can be fabricated from a 316 L stainless steel and functions to equalize the pressure gradient existing between the upper and lower o-ring contact regions within the groove. The sleeve introduces a by-pass channel for the gas to flow through when either the o-ring surface lifts off the valve base surface or the pin body surface. The equalization of the pressure differential in effect eliminates the tendency of the o-ring to become dislodged from its groove during operation.

The modified pin design in conjunction with the o-ring located in the valve base effectively function as a face seal to open and close the valve when bellows 38 expand in response to a sub-atmospheric condition. It will be recognized by those skilled in the art of sealing as a face seal o-ring. The operation of the vacuum actuated check valve 26 is as described above. However, in the sealing arrangement of the present invention, the o-ring 88 remains in a stationary position within the groove, which has been machined into the recessed region of valve base 84. The gas flow valve can only be in either a closed or open position. The closed position corresponds to a position in which the o-ring is compressed within the groove by the annular surface of the sleeve surrounding the pin. The compression of the perfluoro-elastomer o-ring between the valve base and the pin surface at the bottom of the flat region shuts the flow of the gas without allowing leaks past the contact areas. The open position, on the other hand, corresponds to the position in which the modified pin moves axially away from the contacting surface of the o-ring permitting the gas flow around the o-ring and through the interior annulus of the sleeve through the pin passage 44.

Based on the modifications, the poppet is eliminated and an enhanced sealing mechanism with improved structural integrity is provided. This accounts for an increase in gaseous capacity of up to three times higher than that in a standard cylinder. Specifically, it has been found that at a boron trifluoride fill pressure of 1200 psig in a standard 2.2 liter gas cylinder, the cylinder capacity can be as high as 1,000 grams. By comparison, the standard 2.2 liter gas cylinder at a fill pressure of 600 psig, corresponds to about 335 grams of product. Thus, the sealing mechanism of the present invention allows for an increase of capacity by a factor of three.

Referring back to FIG. 1, a restricted flow passage 20 can be placed along the flow path, upstream of the vacuum actuated check valve 26 to restrict the flow of gas in the unlikely event that the check valve fails in an open position, or otherwise valve head 14 having the check valve therein is sheared. One such restrictor in the form of a capillary offers the most flexibility and reliability as a flow restrictor. Whether provided by single or multiple small diameter bores or tightly packed materials, suitable restrictors of this type will desirably limit the transport of gas phase fluids to very low rates.

For example, a single bore capillary can limit atmospheric boron trifluoride release to less than about 35 sccm of boron trifluoride at a cylinder pressure of 1200 psig and temperature of 68° F., while a seven bore capillary can limit the flow rate to about 245 sccm at similar conditions. The capillary tube provides the only exit from cylinder 12, and it can be in a winding formation and ordinarily has an internal diameter of less than 0.02 millimeters (0.001 inch).

Figure 4:
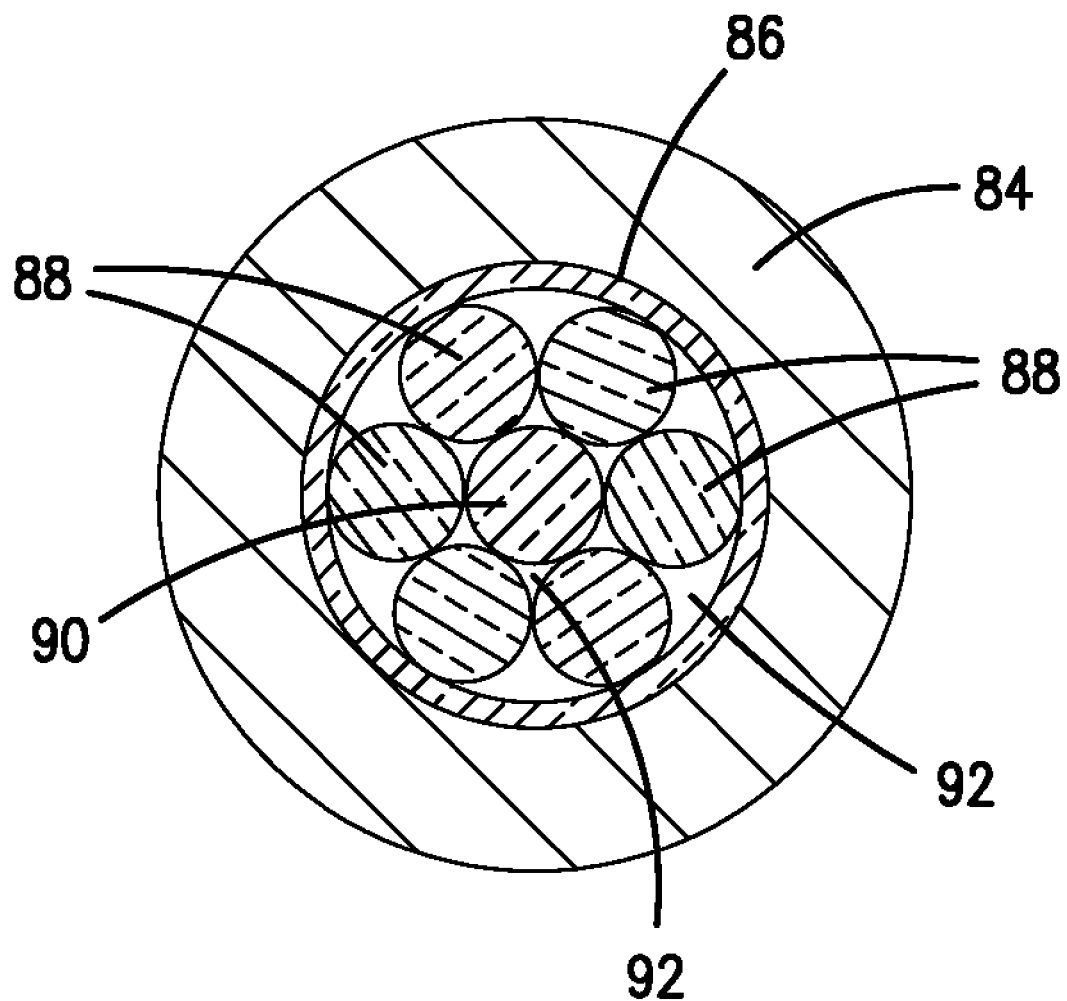
FIG. 4, is a cross-sectional view of the capillary tube shown in FIG. 1.

A variety of suitable capillary structures may be created. As shown more clearly by the cross-sectional view in FIG. 4, a metal tube 84, typically constructed from stainless steel, protectively surrounds a glass tube 86. The inside of diameter tube 86 holds a hexagon arrangement of 6 solid glass rods 88 about a central glass rod 90 and wherein all of the rods have about the same diameter. The spaces 92 between the rods 88 and rod 90 and between the rods 88 and the inside of tube 86 provide flow areas of capillary size for metering gas through the internal flow restrictor 20. Shrinking glass tube over the glass rods 88 and 90 provides a rigid tube and rod assembly. Therefore, even if the internal rods break, retention of the pieces by glass tube 86 will maintain capillary flow through the internal diameter of glass tube 86. Metal tube 84 adds further rigidity and durability when optionally shrunk around glass rods 88 and 90 to provide a reinforced unit. With the optional reinforcement of metal tube 84, fracture of the glass rods or their surrounding glass tube would leave the function of the restricted flow path through the capillary structure substantially unchanged.

The present invention will further be illustrated below by referring to the following example and comparative example, which are, however, not to be construed as limiting the invention.

EXAMPLE 1

Figure 5:
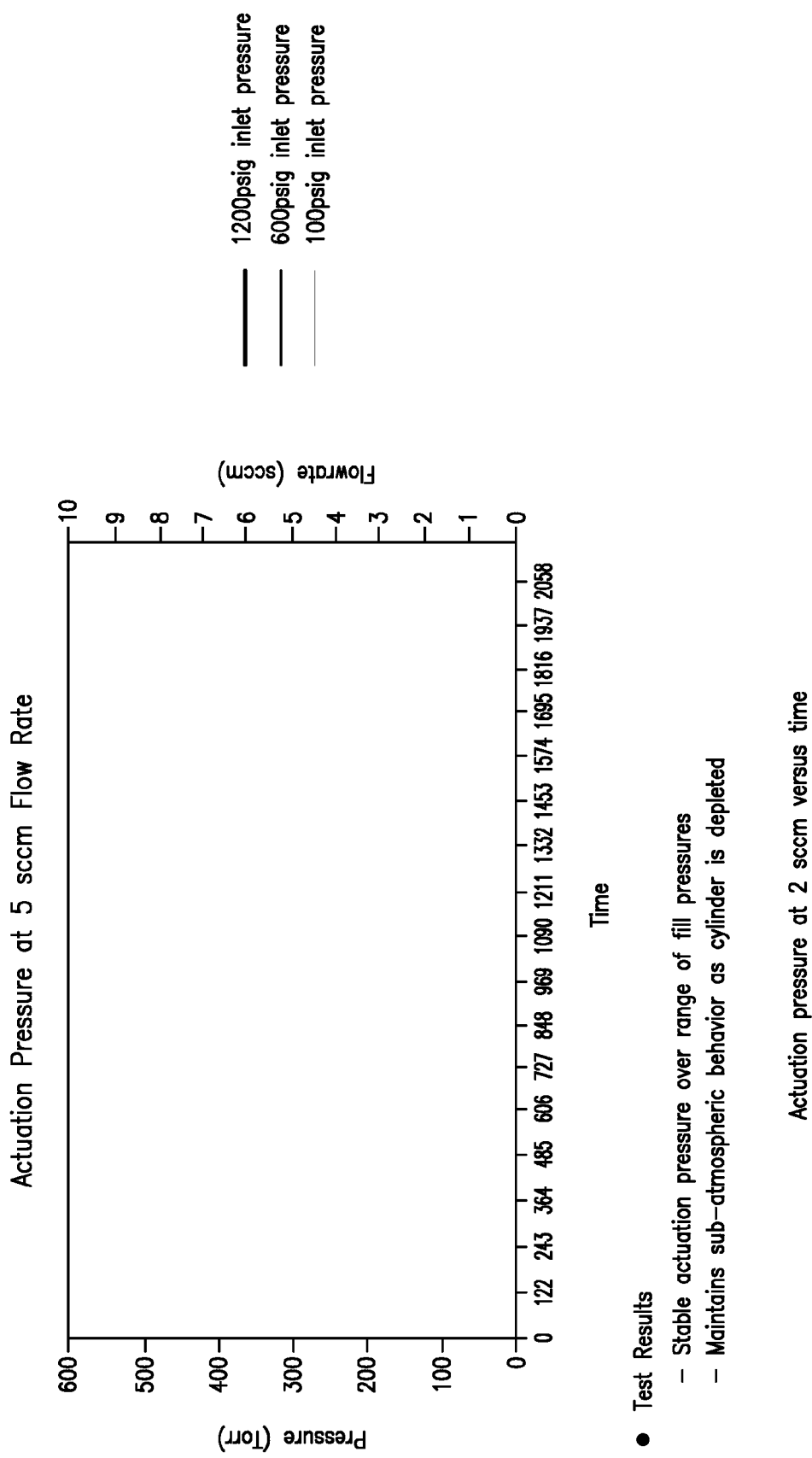
FIG. 5, is a graphical illustration of the actuation pressure over time at 2 sccm flow rate, wherein the systems are filled at various pressures.

A conventional cylinder was filled with boron trifluoride at three separate fill pressures. The first was 100 psig, the second 600 psig, and the third 1300 psig. A vacuum was applied at the outlet of the cylinder outlet port, and a flow rate of 2 sccm was maintained by the mass flow controller downstream of the outlet. The valve actuation pressure profile was then observed for a period of two hours. As shown in FIG. 5 at a fill pressure of 1200 psig, the actuation pressure required to open the cylinder permitting a 2 sccm flow of gas was 250±20 torr. At a cylinder fill pressure of 600 psig, an actuation pressure of 400±20 torr was required to open the valve allowing for a 2 sccm flow rate. Finally, at a fill pressure of 100 psig, the actuation or delivery pressure for a 2 sccm flow rate was 530±20 torr. Hence, as the cylinder fill pressure decreases due to consumption of the gas, the actuation pressure increases. FIG. 5 demonstrates that the o-ring seal of the present invention effectively permits the flow of gas at a fill pressure of 1200 psig as well as 100 psig. Additionally, it indicates the o-ring seal will maintain a stable sub-atmospheric actuation pressure (<760 torr) as the gas is consumed. In other words, when the cylinder pressure is depleted to 100 psig or less as the boron trifluoride product is consumed the actuation pressure still remains well below 600 torr.

EXAMPLE 2

Figure 6:
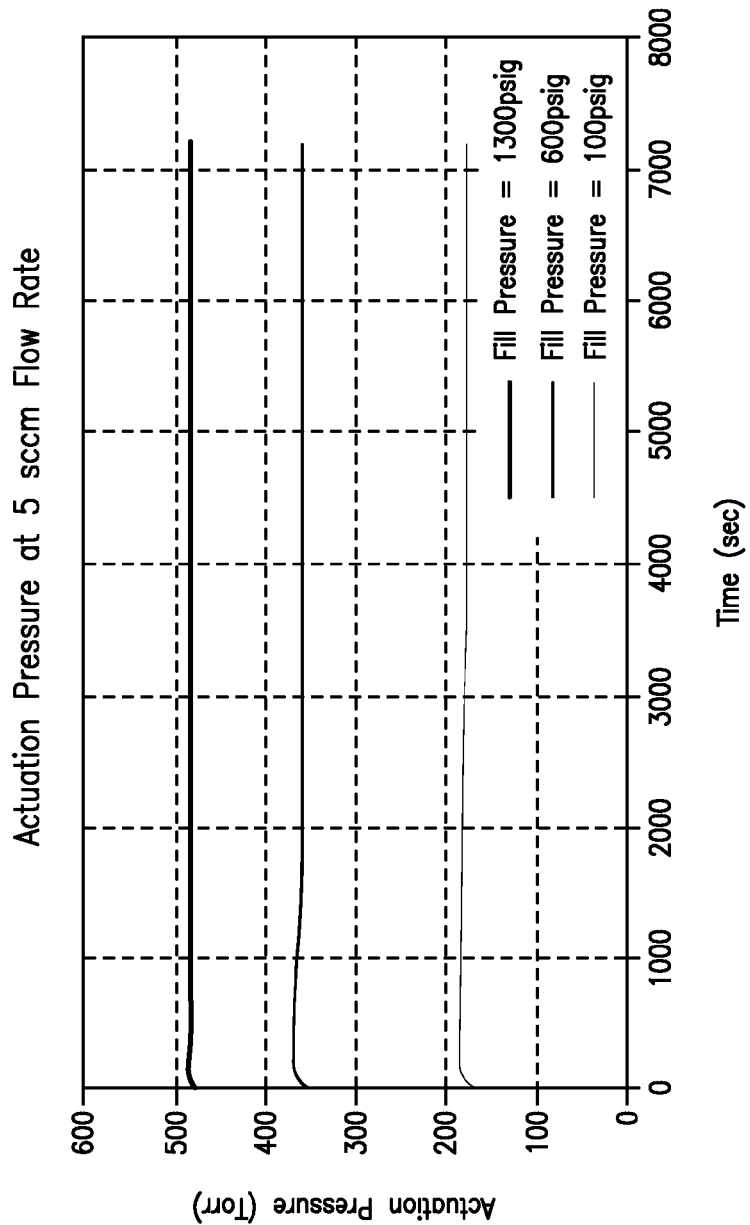
FIG. 6 is a graphical illustration of the actuation pressure over time at 5 sccm flow rate, wherein the systems are filled at various pressures.

A cylinder containing the modified vacuum actuated check valve of the present invention was tested following the same protocol as described in the comparative example above except that the flow rate was increased to 5 sccm. As shown, in FIG. 6, the actuation pressure for the various inlet pressures of the new design appears to stabilize at about 100 seconds. This is quite important because the most critical and time consuming manufacturing operation during the assembly of every vacuum actuated check valve is referred to as "setting the actuation pressure." In terms of production yield this operation is the major bottleneck in terms of manufacturing valves. If a valve stabilizes (at a flow rate of 5 sccm) in 100 seconds it indicates this specific manufacturing step or process referred to as "setting the actuation pressure" can be performed in 100 seconds.

COMPARATIVE EXAMPLE

Figure 7:
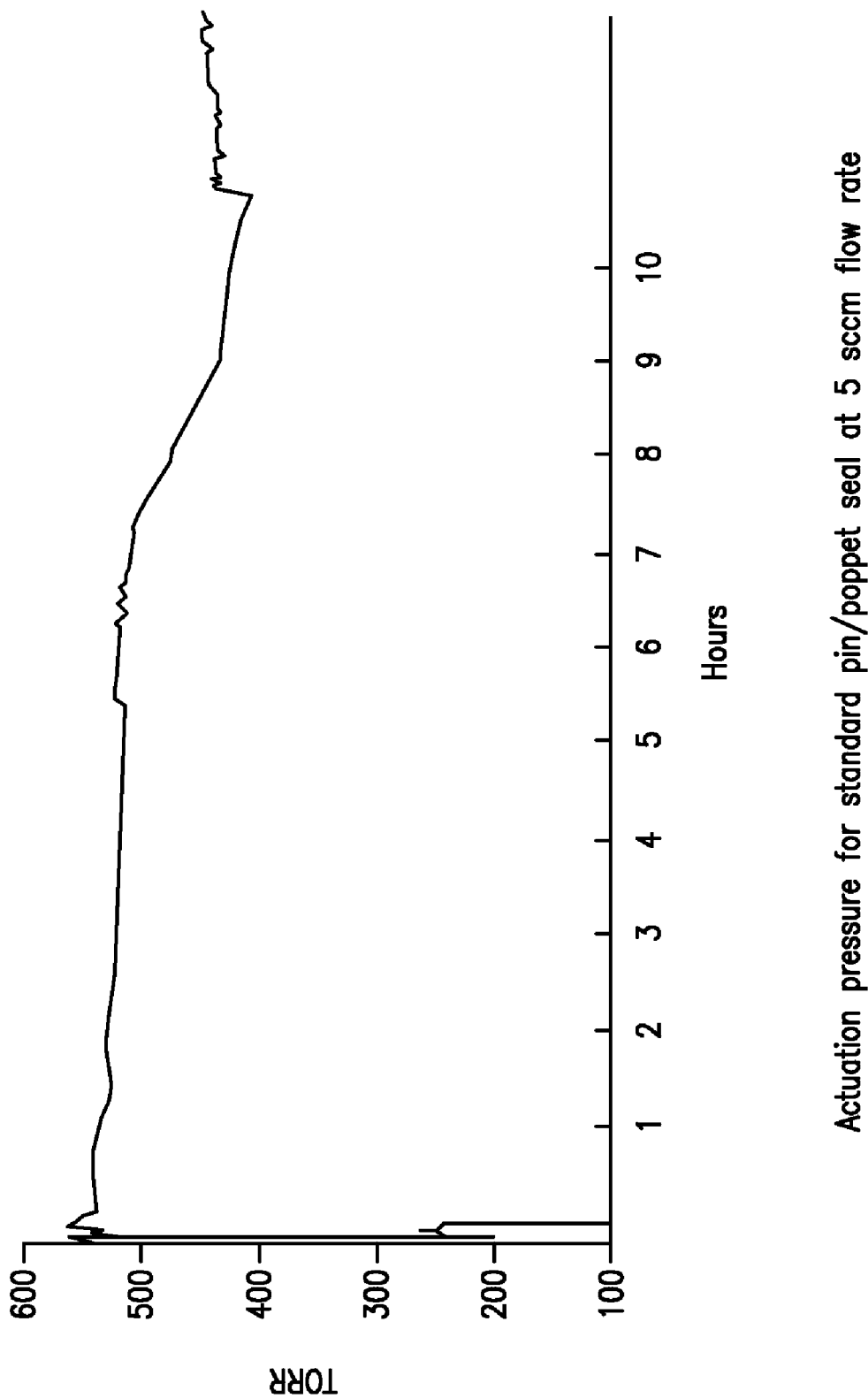
FIG. 7 is a graphical illustration of comparative example, where the actuation pressure of a cylinder with a conventional vacuum actuated check valve was tested at a 5 sccm flow rate.

A cylinder filled to 600 psig and having a conventional vacuum actuated check valve with a pin/poppet arrangement was tested following the protocol of Example 2, at the same gas discharge rate of 5 sccm. By comparison, and with reference to FIG. 7, concerning the actuation pressure it decreases more than 25% (from 550 torr to 400 torr) during a 10-hour period before the actuation pressure stabilizes at a steady state of about 450 torr. Only at the point in time when actuation pressure attains a steady state value, can the actuation pressure of the valve be permanently set. Although many conventional vacuum actuated check valves stabilize within a one or two hour interval, the standard check valve presented in this example is not uncommon.

While the invention has been described in detail with reference to specific embodiments thereof, it will become apparent to one skilled in the art that various changes and modifications can be made, and equivalents employed, without departing from the scope of the appended claims.

What is claimed is:

1. A vacuum actuated check valve for delivery of a fluid from a pressurized fluid source to a downstream processing tool, comprising:
   a valve base having a pin inserted there through for communication with a bellows chamber downstream, wherein the pin and the valve base form a passageway there-between, the pin is adapted for reciprocal movement to bias a spring bushing, the valve base having a counterbore therein, with a sleeve forming a passageway between said pin and sleeve, and an o-ring disposed concentrically around the lower section of the pin and sleeve combination wherein said sleeve is disposed between the circumference of the pin shaft and the inside radius of said o-ring within the counterbore of the valve base, where the pin is firmly held in place by the spring bushing adapted to movement between a sealing position that blocks fluid flow along the passageway and an open position that permits fluid between the pin and sleeve, along the passageway; and the
   bellows chamber disposed downstream of the valve base and pin, wherein the bellows chamber defines an interior volume isolated from the pressure condition upstream of the pin, the bellows chamber is adapted to expand when communication with a discharge path produces a vacuum condition around the bellows and forces a contact plate to impinge onto the pin so as to bias the spring bushing away from the valve base to an open position to allow fluid flow through the passageway in the valve base.

2. The system of claim 1, wherein a spring in the spring bushing acts as a counterforce to the contact plate of the bellows chamber to sealably engage the valve base when the discharge path is at or above an atmospheric condition.

3. The vacuum actuated check valve of claim 2, wherein the o-ring is held in compression between the valve base and the spring bushing forming a face seal therebetween.

4. The vacuum actuated check valve of claim 1, wherein the pin can travel up to 0.010 inches during its reciprocal movement.

5. The vacuum actuated check valve of claim 1, wherein the sleeve is a tubular component of stainless steel.

6. The vacuum actuated check valve of claim 5, wherein the sleeve equalizes the pressure gradient between the upper and lower o-ring contact regions within the counterbore of the valve base.

7. A system for controlling the discharge of pressurized fluids from the outlet of a pressurized tank containing hydridic or halidic compounds, the system comprising:
   a tank for holding pressurized fluids in a gaseous or partially gaseous phase;
   a port body for communicating with the outlet of the pressurized tank defining a fluid discharge path;
   a vacuum actuated check valve disposed along the fluid discharge path including a valve base having a pin inserted there through for communication with a bellows chamber downstream, wherein the pin and the valve base form a passageway there between, the pin is adapted for reciprocal movement to bias a spring bushing, the valve base having a counterbore therein, with a sleeve forming a passageway between said pin and sleeve and an o-ring disposed concentrically around the lower section of the pin and sleeve combination wherein said sleeve is disposed between the circumference of the pin shaft and an inside radius of said o-ring within the counterbore of the valve base, where the pin is firmly held in place by the spring bushing adapted to movement between a sealing position that blocks fluid flow along the passageway and an open position that permits fluid between the pin and sleeve, along the passageway; and the
   bellows chamber disposed downstream of the valve base and pin, wherein the bellows chamber defines an interior volume isolated from the pressure condition upstream of the pin, the bellows chamber is adapted to expand when communication with a discharge path produces a vacuum condition around the bellows and forces a contact plate to impinge onto the pin so as to bias the spring bushing away from the valve base to an open position to allow fluid flow through the passageway in the valve base.

8. The system of claim 7, wherein the vacuum actuated check valve is disposed entirely or partially within the port body.

9. The system of claim 7, wherein the vacuum actuated check valve is disposed within the cylinder, upstream of the port body.

10. The system of claim 7, wherein the tank contains a gaseous fluid at a pressure ranging from about 600 psig to about 1500 psig at maximum capacity conditions.

11. The system of claim 7, wherein the bellows chamber is sealed with a pressure of about 25 psia.

12. The system of claim 7, wherein the tank further includes a restrictor along at least a portion of the flow path that limits the flow of the gas contained in the container to less than 35 sccm at atmospheric conditions.

13. The system of claim 12, wherein the restrictor is at least one conduit.

14. The system of claim 12, wherein the at least one conduit is a capillary tube having an internal diameter that does not exceed 0.2 mm.

15. A cylinder and a valve assembly for containing pressurized fluid and controlling the discharge of pressurized fluids from the cylinder, the cylinder and the valve assembly comprising:

a cylinder having a cylinder opening;

a port body adapted for sealing engagement with the cylinder opening;

a fluid inlet port defined by the port body and located within the cylinder;

a fluid outlet port defined by the port body and located outside the cylinder;

a fluid discharge path defined by the port body between the fluid inlet port and the fluid outlet port;

a shut-off valve for controlling fluid flow along the fluid discharge path;

a vacuum actuated check valve disposed along the fluid discharge path including a valve base having a pin inserted therethrough for communication with a bellows chamber downstream, wherein the pin and the valve base form a passageway therebetween, the pin is adapted for reciprocal movement to bias a spring bushing, the valve base having a counterbore therein, with a sleeve and an o-ring disposed concentrically around the lower section of the pin, wherein said sleeve is disposed between the circumference of the pin and the inside radius of said o-ring, where the pin is firmly held in place by the spring bushing adapted to movement between a sealing position that blocks fluid flow along the passageway and an open position that permits fluid along the passageway; and the bellows chamber disposed downstream of the valve base and pin, wherein the bellows chamber defines an interior volume isolated from the pressure condition upstream of the pin, the bellows chamber is adapted to expand when communication with a discharge path produces a vacuum condition around the bellows and forces a contact plate to impinge onto the pin so as to bias the spring bushing away from the valve base to an open position to allow fluid flow through the passageway in the valve base.

16. The cylinder and a valve assembly of claim 15, wherein the bellows are adapted to impinge on the pin via the contact plate and open the passageway upon sensing a sub-atmospheric condition.

* * * * *